United States Patent [19]

Fournier et al.

[11] Patent Number: 5,167,253
[45] Date of Patent: Dec. 1, 1992

[54] FLOW REGULATOR VALVE

[75] Inventors: Thierry Fournier, Andilly; Jean-Pierre Truffaut, Saint Brice Sous Foret, both of France

[73] Assignee: Alsthom Fluides Sapag, France

[21] Appl. No.: 762,113

[22] Filed: Sep. 19, 1991

[30] Foreign Application Priority Data

Sep. 19, 1990 [FR] France .................. 90 11561

[51] Int. Cl.⁵ .................................. G05D 7/01
[52] U.S. Cl. .................................... 137/504
[58] Field of Search ........................ 137/501, 504

[56] References Cited

U.S. PATENT DOCUMENTS

| | | | |
|---|---|---|---|
| 2,813,541 | 11/1957 | Beller | 137/504 |
| 2,967,543 | 1/1961 | Viergutz | 137/504 X |
| 3,117,590 | 1/1964 | Nelson et al. | |
| 3,805,824 | 4/1974 | Robbins | 137/504 |
| 4,014,473 | 3/1977 | Rosenberg | |

FOREIGN PATENT DOCUMENTS 393250 8/1931 United Kingdom .
836439 6/1960 United Kingdom .

Primary Examiner—Stephen M. Hepperle
Attorney, Agent, or Firm—Sughrue, Mion, Zinn, Macpeak & Seas

[57] ABSTRACT

Upwards motion of a shutter tends to close a regulation passage controlling the flow rate to be regulated, which motion is driven by a piston under drive from a driving pressure drop that increases with increasing flow rate. According to the invention, the shutter is constituted by a tube whose top edge delimits the regulation passage, with the driving pressure drop appearing on the flow passing around the piston. The invention is particularly applicable to irrigation.

2 Claims, 3 Drawing Sheets

5,167,253

FLOW REGULATOR VALVE

FIELD OF THE INVENTION

The invention relates to a valve which, when installed on a duct conveying a fluid, automatically maintains a constant flow rate independently of the pressures that obtain upstream and downstream from the valve, and without requiring any external energy other than the mechanical energy of the fluid.

The invention has particular applications in irrigation networks where parcels of land to be irrigated are fed via ducts under pressure. Under such circumstances, the water pressure at a parcel varies over time depending on the amount of water being consumed by other irrigation, since head losses along ducts vary very substantially as a function of the flow rates passing along them. To obtain good use of irrigation water, it is important that the flow rate delivered to a parcel does not vary in uncontrolled manner.

PRIOR ART

Prior valves of this kind include a shutter member which, on moving upwards, tends to close a regulation passage controlling the flow rate to be regulated, with the upwards movement being driven by a piston under the effect of a driving pressure drop that increases with said flow rate.

Such known valves suffer from at least one of the following drawbacks:

shutter member displacement is sometimes prevented by solid particles contained in the water flowing through the valve, thereby preventing the valve from operating;

flow rate regulation is not accurate enough; and the cost of manufacturing or of maintaining the valve is too high.

SUMMARY OF THE INVENTION

The present invention provides a valve including a shutter member driven by a piston as mentioned above. In order to remedy the drawbacks of known valves, the shutter member is constituted by a tube having an edge delimiting said regulation passage, the driving pressure drop appearing where the flow passes around the piston.

BRIEF DESCRIPTION OF THE DRAWINGS

An implementation of the present invention is described below with reference to the accompanying diagrammatic figures, it being understood that the items and dispositions described and shown are given purely by way of non-limiting example. When the same item is shown in more than one figure, it is designated therein by the same reference symbol.

MORE DETAILED DESCRIPTION

Figure 1:
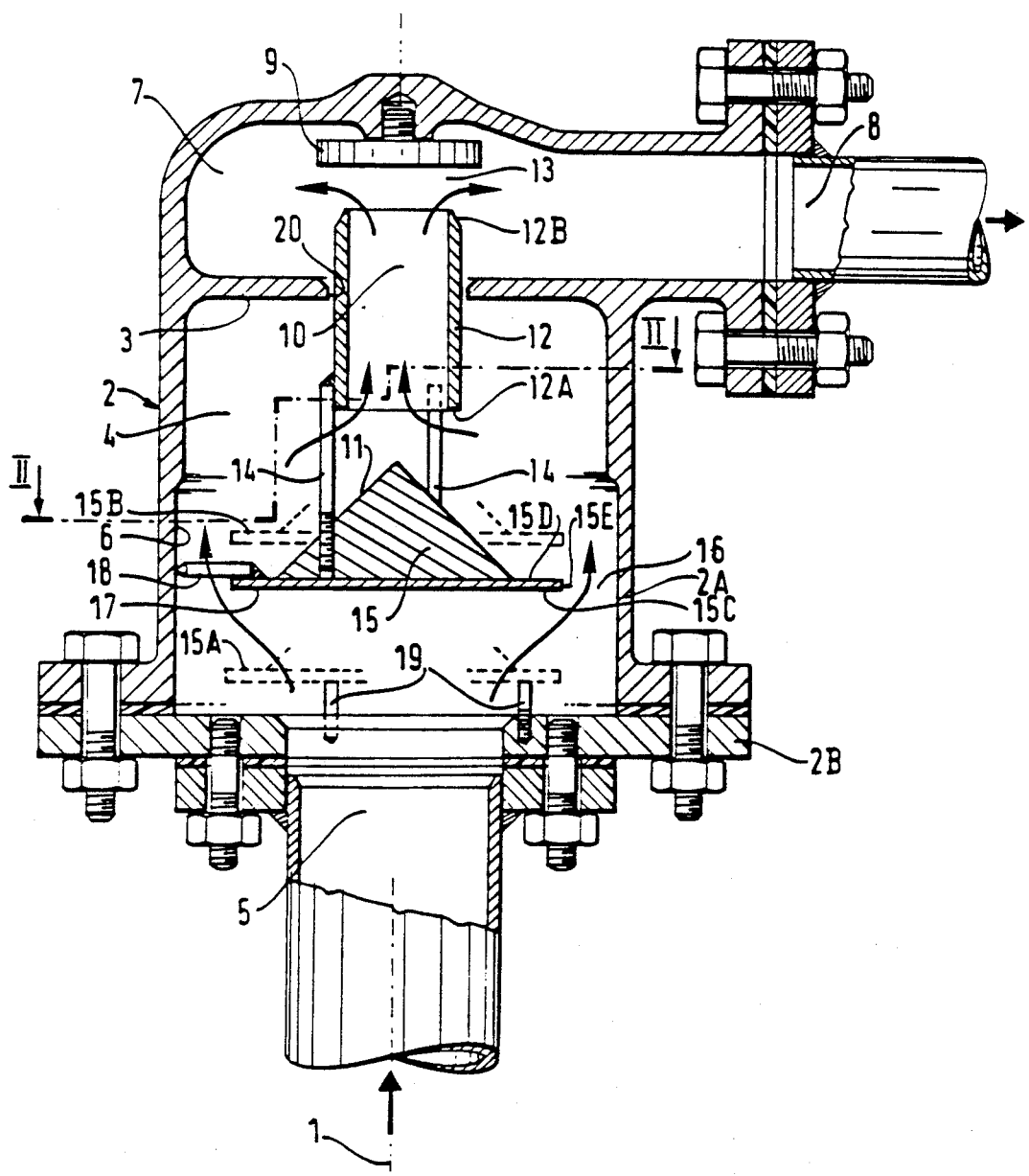
FIG. 1 shows a first valve of the present invention in section on an axial vertical plane I—I of FIG. 2.

A general description is initially given of a valve of the present invention in which the fluid whose flow rate is to be regulated is a liquid, it being understood that the fluid could alternatively be a gas. The first and second valves mentioned above and shown in the drawings are then described in greater detail. The valve includes certain items that are specified with reference to FIGS. 1 and 2 and that are known with respect to the functions mentioned:

A valve body 2 constituting an enclosure.

An inlet orifice 5 to enable a liquid whose flow rate is to be regulated to enter the body, which liquid is at an inlet pressure at this point.

An outlet orifice 8 to allow the liquid to leave the body. The pressure of the liquid in the outlet orifice constitutes an outlet pressure and, relative to said inlet pressure, it presents a pressure drop due to its passage through the valve.

A regulation shutter member 12 which is vertically movable within the valve body 2 between a low position 15A and a high position 15B.

A regulator passage 13 which is taken by the liquid and which is closed by the shutter member 12 to a variable extent which increases as the shutter member approaches its high position. On passing through this passage the liquid is thus subjected to a variable regulating pressure drop which constitutes a first fraction of said pressure drop on passing through the valve.

A piston 15 linked to the shutter member 12 in such a manner as to constitute therewith a moving assembly 12, 15. The piston has a bottom surface 15C and a top surface 15D which are subjected to the pressures that exist in the liquid in zones respectively situated beneath and above the piston.

A driving passage 16 is formed between the piston 15 and a valve body for passage of the liquid. This passage separates zones respectively upstream and downstream from the driving passage and which are in communication respectively with said zones situated beneath and above the piston 15. On passing through this passage, the liquid is subjected to a driving pressure drop which constitutes a second fraction of said pressure drop on passing through the valve and which applies an upwards force on the piston 15 that increases with increasing liquid flow rate.

In accordance with the present invention, the valve body 2 includes a transverse intermediate partition dividing it into a lower chamber 4 and an upper chamber 7 and presenting a communication orifice 10. The moving shutter member is in the form of a vertical shutter tube 12 sliding in the communication orifice 10. The tube has a bottom edge 12A situated in the lower chamber 4 and a top edge situated in the upper chamber 7. The regulator passage 13 is formed between the top end 12B and a regulation seat 9 carried by the valve body 2. The driving passage 16 is an annular passage formed between an inner lip 15E constituted by a peripheral portion of the piston 15, and an outer lip constituted by an inside surface 16 of the valve body 2 facing said inner lip. One of said inner and outer lips constitutes a cylindrical liner 6 having vertical generator lines.

The following dispositions which likewise appear in the figures are also preferably adopted:

The moving assembly 12, 15 is guided in the valve body 2 by fingers 18 which extend at least part of the way across the gap between the body and the moving assembly and which are distributed angularly around the assembly.

The piston 15 is situated in the lower chamber 4 above the inlet orifice 5, with the upper chamber 7 including the regulation seat 9 and the outlet orifice 8.

Figure 2:
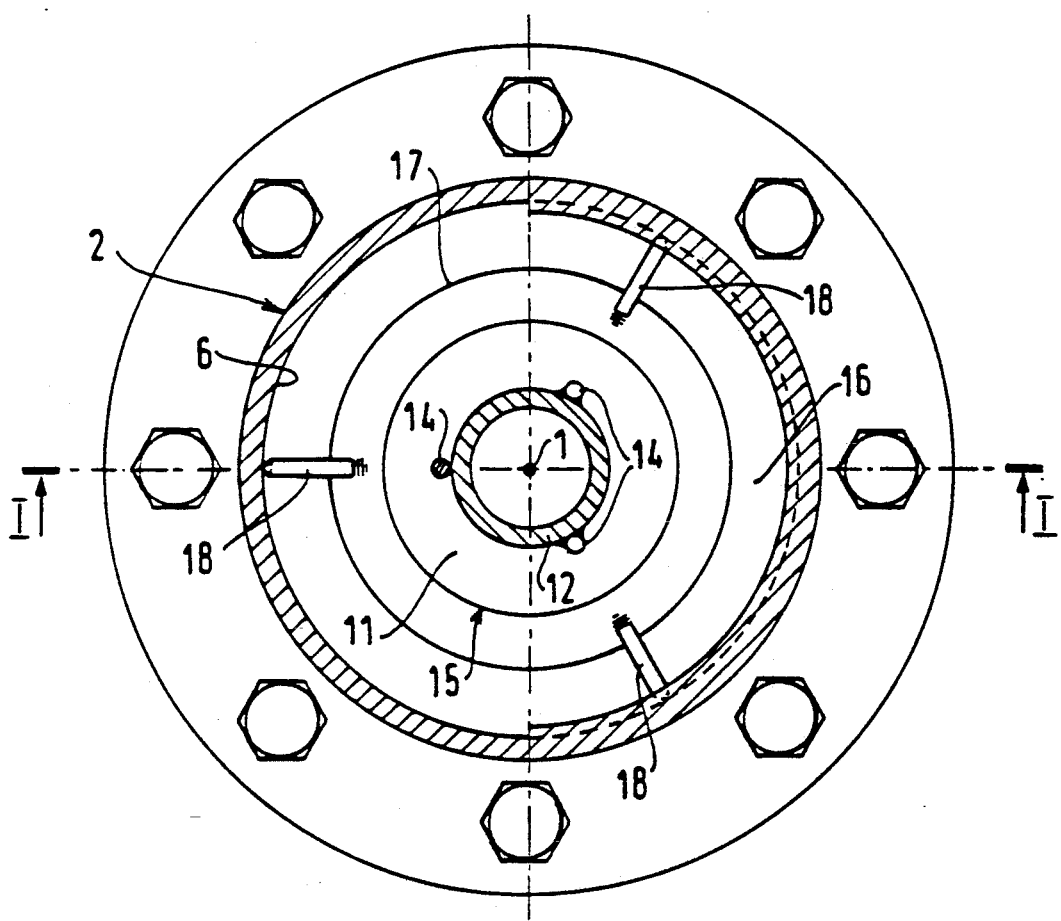
FIG. 2 shows the same first valve in section on a horizontal plane II—II of FIG. 1.
Figure 3:
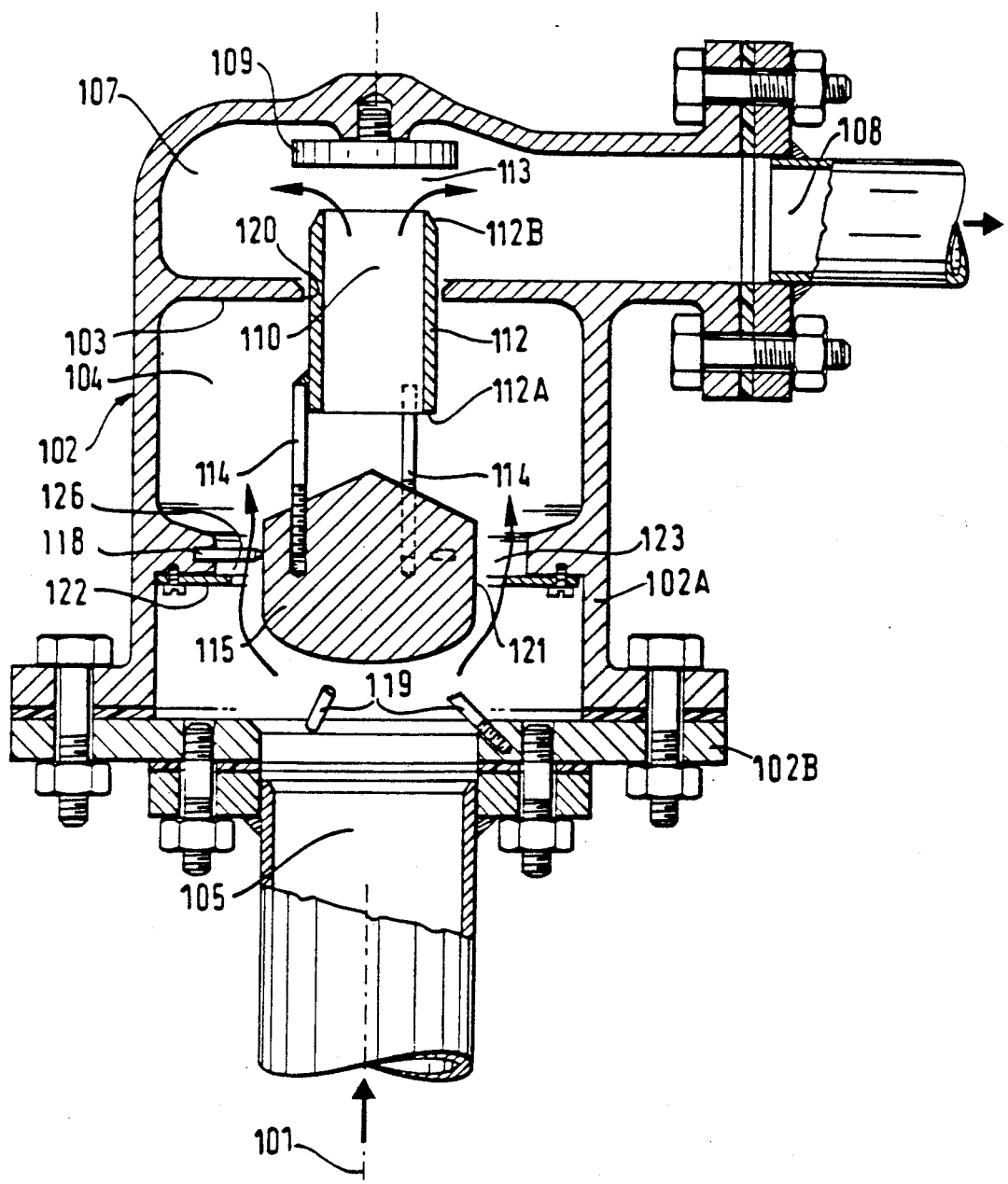
FIG. 3 shows a second valve of the present invention in section on an axial vertical plane.

The first valve shown in FIGS. 1 and 2 is now described in greater detail.

This valve operates properly only if it is mounted about a vertical reference axis 1.

The valve body 2 is divided into two chambers by an intermediate partition 3. The lower chamber 4 includes the inlet orifice 5 which is preferably located in its base. It also includes the liner 6 which is symmetrical about the axis 1. The liner is preferably cylindrical. It may be constituted by the wall of the chamber or by a part fitted thereto.

The upper chamber 7 includes the outlet orifice 8 which is preferably located to one side. The top wall of the upper chamber supports the fixed regulation seat 9 which is preferably centered on the axis 1. This seat may be constituted by the wall of the chamber or by a part fitted thereto.

The intermediate partition 3 is pierced where the reference vertical axis 1 intersects the communication orifice 10, which orifice is preferably cylindrical. A moving assembly is contained in the valve body. It comprises, in particular, a shutter tube 12 disposed on the axis 1. For example, the diameter of the tube may be constant along its entire length. It extends from the lower chamber 4 to the upper chamber 7, passing through the orifice 10. Moving the tube in translation along the axis 1 serves to vary the cross-section of the regulation passage 13 which is formed between the top end 12B of the tube and the seat 9. The tube 12 is securely fixed to the piston 15 in the lower chamber 4 by means of links 14. Within the liner 6, the piston forms the driving passage 16 which presents a reduced flow section for the liquid. Within the liner 6, the piston preferably includes a horizontal circular plate 17 whose axis coincides with the axis 1.

Guide fingers 18 represented by way of non-limiting example by lengths of rod fixed to the plate 17 serve to hold the moving assembly centered on the axis 1, in such a manner as to ensure that the only way it can move is in translation along the axis.

By way of non-limiting example, a bottom abutment 19 for the moving assembly is represented as being in the form of lengths of rod fixed to the valve body 2.

In a preferred embodiment, the valve body is made of two portions 2a and 2b enabling the moving assembly to be mounted therein.

This valve operates as follows:

The fluid which enters the valve via its inlet orifice 5 is constrained to pass through the driving passage 16, thereby giving rise to a first pressure drop around the piston 15, thus creating an upwardly directed hydrodynamic driving force. This force increases regularly with increasing flow rate. The fluid then flows towards the upper chamber mainly through the tube 12, with a small fraction of the fluid flowing through the clearance 20 between the tube and the partition 3, with the fluid flow exerting substantially no vertical force on the tube.

At the outlet from the tube 12, a second pressure drop occurs on passing through the passage 13. This pressure drop increases when the tube 12 moves closer to the seat 9.

The moving equipment is also subjected along the axis 1 both to the force of gravity acting downwards and to buoyancy acting upwards. It finds equilibrium when the hydrodynamic force is equal to the force due to gravity minus the buoyancy, i.e. for a given hydrodynamic force that corresponds to an equilibrium flow rate.

In this way, the valve automatically regulates the flow rate to a constant value which is independent of the inlet and outlet pressures, so long as the difference between these two pressures lies within a predetermined range corresponding to the full stroke of the moving assembly 12. 15 between its low position and its high position. These positions are represented in the figures by corresponding positions 15A and 15B of the peripheral portion of the piston 15.

The second valve given by way of example is generally analogous to the first, except for certain points as specified below: each of the components in the second valve that is analogous to a component in the first is given the same reference numeral plus 100.

The difference between the two valves is as follows:

Whereas the cylindrical liner 6 of the driving passage in the first valve is constituted by the wall of the body 2, in the second valve, this liner is constituted by a side wall 121 of the piston 115. In the second valve, the outer lip of the passage is constituted by a plate 122 pierced by an orifice 123 about an axis 101 of the valve. The plate is fixed to the wall of the lower chamber 104 so as to delimit a driving passage 126. The guide fingers 118 are carried by the outer lip.

We claim:

1. A flow rate regulator valve comprising:

a valve body constituting an enclosure;

an inlet orifice for enabling a liquid to enter into the valve body, said liquid having an inlet pressure;

an outlet orifice enabling said liquid to leave said valve body, the liquid having an outlet pressure which exhibits a pressure drop relative to said inlet pressure due to the liquid passing through the valve;

a regulation shutter member forming a portion of a moving assembly and means for mounting said shutter member for vertical movement in said valve body between a low position and a high position;

means defining a regulator passage taken by said liquid which is closed by said regulation shutter member to a varying extent which increases as the shutter member moves towards said high position, such that said liquid is subjected to a variable regulating pressure drop as it passes through said regulator passage, said pressure drop constituting a first fraction of said pressure drop to which the liquid is subjected on passing through the valve;

a piston forming a portion of said moving assembly and having a lower surface and an upper surface which are subjected to the pressure of said liquid respectively in a zone beneath said piston and in a zone above said piston; and a driving passage taken by the liquid between a zone upstream from the driving passage and a zone downstream from the driving passage which zones are respectively in communication with said zones beneath said piston and the zone above said piston, whereby said liquid is subjected to a driving pressure drop on passing through said passage, which pressure drop is a second fraction of said pressure drop to which the liquid is subjected on passing through the valve, and applies an upwards force on said piston that increases with increasing liquid flow rate;

said valve body including a transverse intermediate partition dividing it into a lower chamber and an upper chamber, and having a communication orifice;

said moving shutter member being in the form a vertical shutter tube sliding in said communication orifice and having a bottom edge which is situated in said lower chamber and a top edge which is situated in said upper chamber;

said regulator passage being formed between said top edge and a regulation seat carried by said valve body;

said driving passage being an annular passage formed between an inner lip constituted by a peripheral portion of said piston and an outer lip constituted by an inside surface of said valve body facing said inner lip, one of said inner and outer lips constituting a cylindrical liner having vertical generator lines, and wherein said assembly is guided in said valve body by fingers extending over at least a portion of a gap formed between said moving assembly and said body, and wherein said fingers are angularly distributed around said moving assembly.

2. A flow rate regulator valve according to claim 1, wherein said piston is situated in said lower chamber above said inlet orifice, said upper chamber including said regulation seat and said outlet orifice.

* * * * *